Figure 1:
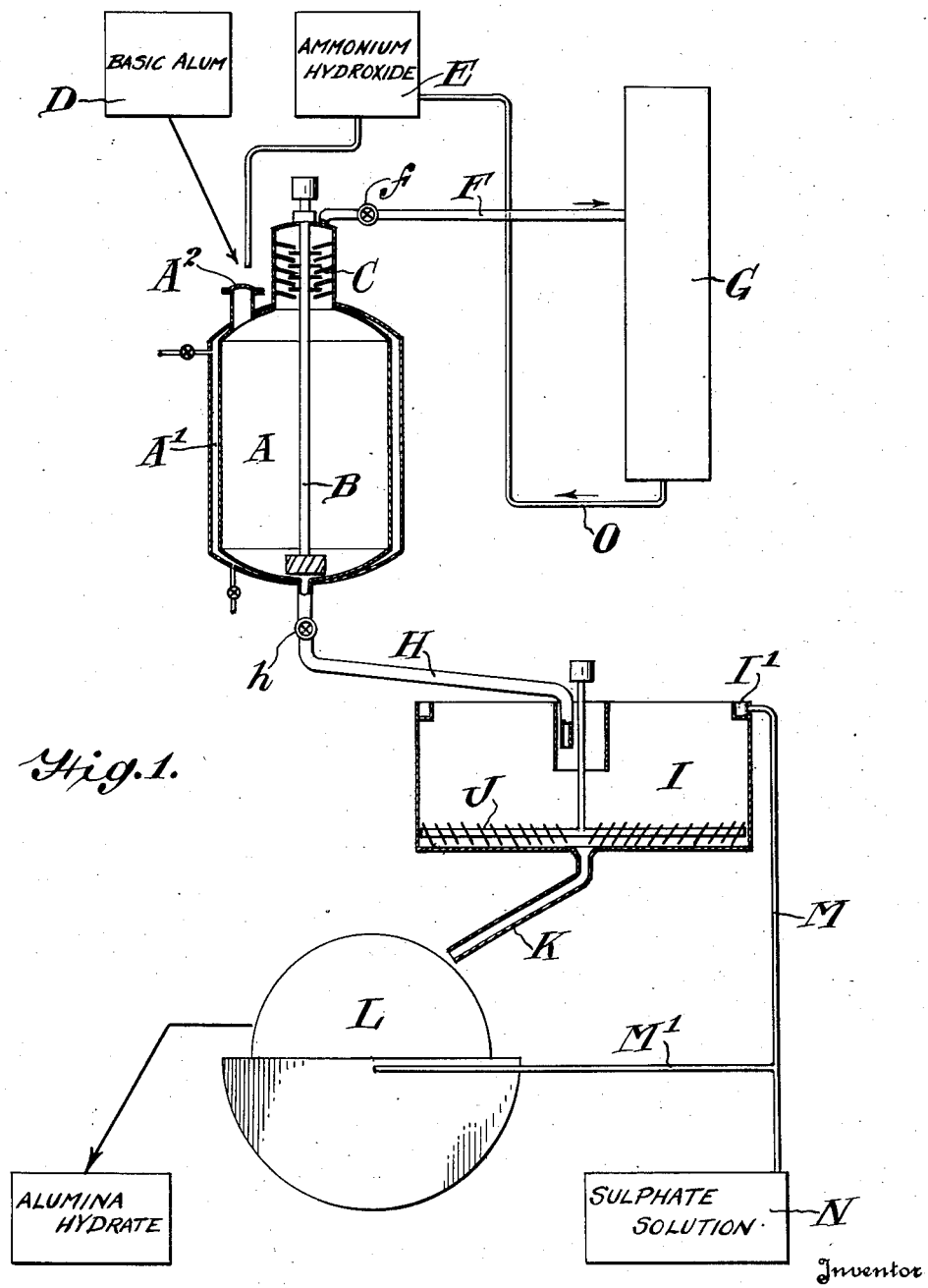

May 14, 1935. A. FLEISCHER 2,000,939

MANUFACTURE OF ALUMINA HYDRATE

Filed July 7, 1933 2 Sheets-Sheet 1

Inventor

Arthur Fleischer,

By Francis J Chambers
Attorney

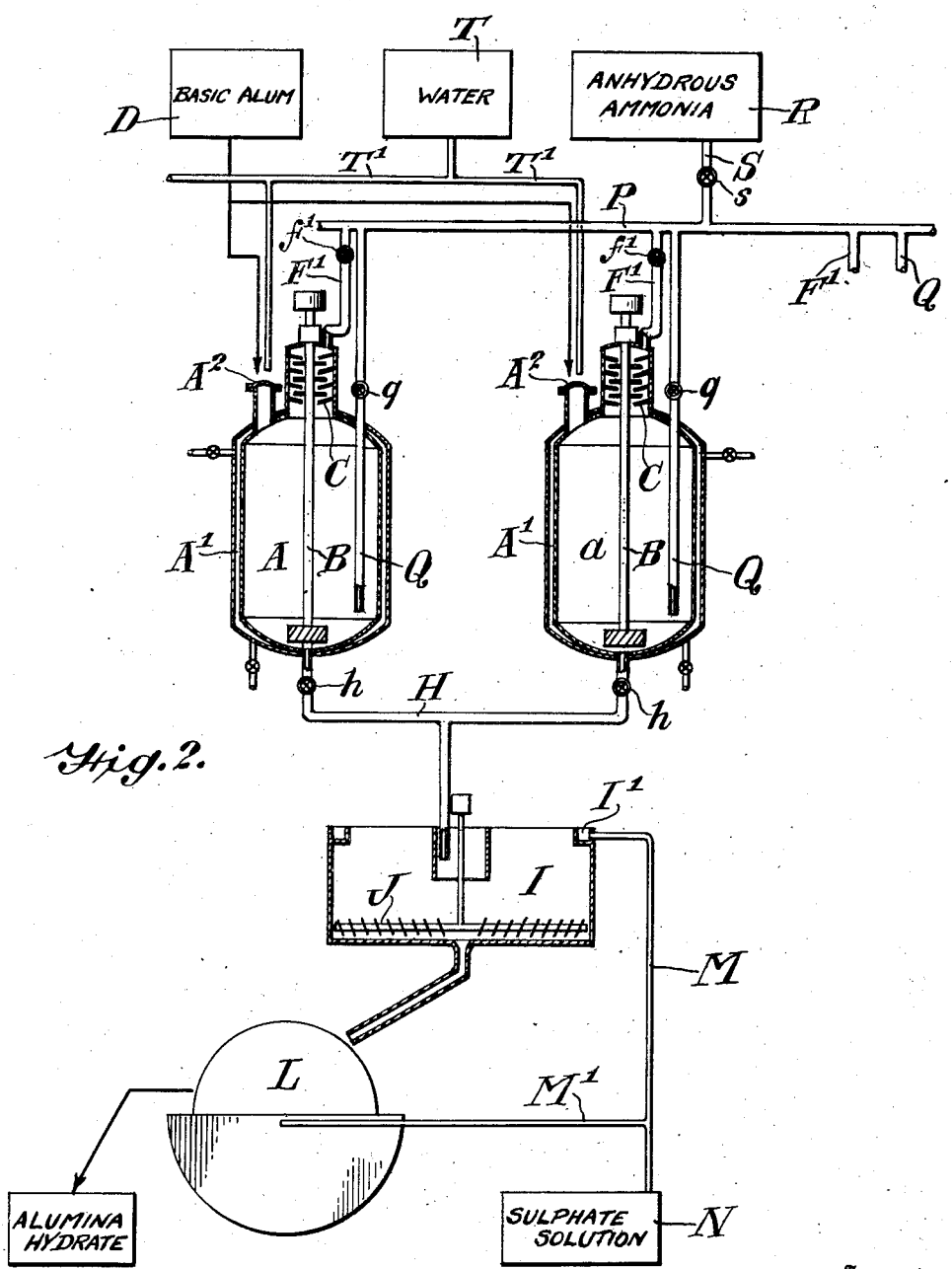

Patented May 14, 1935

2,000,939

UNITED STATES PATENT OFFICE 2,000,939

MANUFACTURE OF ALUMINA HYDRATE

Arthur Fleischer, Hartford, Conn., assignor to Kalunite Company, Philadelphia, Pa., a corporation of Delaware Application July 7, 1933, Serial No. 679,309

3 Claims. (Cl. 23—143)

My invention relates to the manufacture of alumina hydrate and has for its object to provide an efficient process for manufacturing alumina hydrate from an insoluble basic alum as a starting material.

It is known that a basic alum can be treated with ammonium hydroxide with the result of a reaction between the sulphur trioxide component of the basic aluminum sulphate constituent of the basic alum and the formation of alumina hydrate and a solution of the ammonium sulphate formed by the union of the ammonia with the sulphur trioxide and in the case where the basic alum is a potash or sodium alum the solution will also contain potassium or sodium sulphate but while this reaction is, as I have said, a known reaction, it has not, so far as I am aware, been developed into a practical manufacturing process owing, mainly, that in carrying out the reaction with an excess of ammonia, no economical and technically feasible provision was made to prevent losses of ammonia in the further treatment of the reaction mixture and my invention consists, generally speaking, in the following progressive steps:

First.—I thoroughly mix the basic alum, which should be in a state of fine division, with a solution of ammonia (ammonium hydroxide) containing ammonia in excess of that equivalent to the sulphur trioxide with which it is to react to an amount of approximately 18% for solutions up to cencentrations of 12% ammonia by weight. The solution during this reaction should be maintained at temperatures above 60° C. and preferably approximately 110° C. and the reaction will be completed in approximately one hour and, under the conditions specified, substantially all of the basic alum will be converted into insoluble alumina hydrate and a solution of sulphates which in the case that the basic alum is an ammonium alum will consist entirely of ammonium sulphate and in cases where the basic alum is an alkali metal alum the resultant solution will contain the sulphates of ammonia and of the alkali metal constituent of the alum.

The second step of my process consists in boiling off from the solution obtained by the above described treatment all the ammonia still present as such in the solution by reason of the excess of ammonia in the ammonium hydroxide used for the treatment of the alum and the recovery of this ammonia. Where the temperature of the solution has been raised to a point of approximately 110° C., the heat of the solution itself will volatilize and drive off all this excess ammonia. If a lower temperature has been maintained during the reaction, it may be necessary to heat the solution and/or to apply a slight vacuum.

The third step of my process consists in separating the insoluble alumina hydrate from the sulphate solution which may be accomplished in any convenient way but, preferably, I first subject the products of the reaction, that is, the alumina hydrate and sulphate solution or solutions, to a thickening treatment which may be effected in any well-known form of thickener and then treat the thickened product of this treatment to filtration in order to effect an entire separation of the alumina hydrate from the sulphate solution or solutions. The sulphate solutions drawn from the thickener and filter will ordinarily be treated for the recovery therefrom of the sulphates.

While my invention may be practiced by charging the basic alum and previously formed ammonium hydroxide into the autoclave and by recovering the ammonia gas driven off from the reaction mixture in an absorption tower, it is preferably practiced in a plant comprising a plurality of autoclaves and by a procedure in which the autoclaves are charged with an aqueous suspension of a basic alum to which ammonia gas is introduced to form with the water ammonium hydroxide and by a further procedure in which, after the completion of the reaction in the autoclave, the ammonia gas driven off from the autoclave is delivered directly to a second autoclave charged with an aqueous suspension of basic alum and to which, after the absorption in the water of the ammonia gas driven off from the first autoclave, additional ammonia gas is supplied to bring the produced ammonium hydroxide to the proper strength for the completion of the reaction in the second autoclave from which, again, the uncombined ammonia gas is driven off and re-absorbed in another charged autoclave. The advantages of my preferred method of practicing my invention are, a simplification of apparatus in that it enables me to dispense with absorption towers, the avoidance of losses of ammonia incidental to the handling of ammonium hydroxide and the utilization of the exothermic heat involved in the absorption of the ammonia in water as a means for heating the aqueous suspension of basic alum; or, rather, of the suspension of basic alum in the progressively formed ammonium hydroxide component of the autoclave charge.

My invention will be perhaps better understood as described in connection with the diagrammatic drawings forming part of this specification in which Figure 1 illustrates a plant adapted for the practice of my invention by the method in which an autoclave is directly charged with finely divided basic ammonium alum and previously formed ammonium hydroxide and in which the excess ammonia content in the charge of the autoclave, after the completion of the reaction, is recovered as ammonium hydroxide in an absorption tower, while in Figure 2 I have illustrated a plant adapted for the practice of my process in the preferential way in which the autoclaves forming part of the system are charged initially with an aqueous suspension of the basic alum to which ammonia gas is supplied to form ammonium hydroxide in the autoclaves, from which autoclaves, after the reaction is complete, the excess ammonia gas is driven off and conveyed directly to an autoclave freshly charged with an aqueous suspension of the basic alum to initiate in said second autoclave the formation of an ammonium hydroxide solution which is brought to proper strength by the admission to the autoclave of ammonia gas from an independent source of supply, and showing a combination lay-out of apparatus for the practice of the process. In Figure 1 of the drawings, A indicates an autoclave. The autoclave should be formed of or lined with a corrosion resisting material, such as lead, and, as shown, is provided with a steam jacket as $A^1$ and with a stirring apparatus indicated at B. I have indicated the top of the autoclave as of contracted diameter and provided with baffles indicated at C, to trap any mist of solution escaping from the autoclave with the ammonia gas. At $A^2$ I have indicated a man-hole through which, as indicated, basic alum and ammonium hydroxide can be introduced into the autoclave from reservoirs indicated at D and E. F indicates a conduit leading from the top of the autoclave to an absorption tower indicated at G, $f$ indicating a valve in the conduit F. H indicates a conduit ($h$ indicating a valve in said conduit) leading from the bottom of the autoclave to a thickener indicated at I, having a launder at its top, indicated at $I^1$ and provided with rakes at its bottom, as indicated at J. From the bottom of the thickener, a conduit K leads to a filter, indicated at L, which, as conveniently indicated and as preferably used, is a vacuum filter but which, of course, can be of any type. Conduits M and $M^1$ lead from the launder and from the filter and connect with a reservoir for the sulphate solution or solutions indicated at N. The alumina hydrate is, of course, withdrawn from the filter, as indicated. I have indicated at O a conduit leading from the absorption tower G to the reservoir E, indicating that the ammonium hydroxide recovered is to be used in connection with fresh ammonium hydroxide for the treatment of further bodies of basic alum.

In operation, the autoclave A is charged with a basic alum in a state of fine division, preferably as a moist filter cake and with a solution of ammonia (ammonium hydroxide) which solution should contain ammonia in excess of that which is theoretically equivalent to the sulphur trioxide component of the aluminum sulphate constituent of the basic alum. The excess of ammonia can be varied considerably but, for good practical working conditions with solutions of ammonium hydroxide up to 12% ammonia concentration, I prefer to use about 18% over that theoretically required. A practical charge for the autoclave are the proportions of 130 lbs. of a wet filter cake of basic ammonium alum, preferably manufactured in a continuous autoclave supplied with steam as a heating medium, and containing 33.3 lbs. of alumina, 34.8 lbs. of sulfur trioxide combined with the alumina, 14.3 lbs. of ammonium sulfate and 30 lbs. uncombined moisture, and 178 lbs. of ammonium hydroxide, containing 9.8% ammonia by weight, which allowing for the moisture content of the cake forms an 8% ammonia solution.

At concentrations higher than 12% of ammonia, the excess of ammonium hydroxide will be controlled by two factors, both of which influence the rate and extent of the reaction, and which are, first the swelling of the alumina hydrate and secondly, the solubility of the sulfates formed in the reaction. The alumina hydrate obtained from this reaction contains, after filtration and removal of the sulfate solution, free moisture to the extent of 150% to 200% of its dry weight, depending on the basic alum, the ammonia concentration, and the reaction temperature. Above 12% ammonia concentration and with 18% excess ammonia, the amount of water in the ammonium hydroxide becomes insufficient to satisfy the degree of swelling of the alumina hydrate or to dissolve the sulfates formed in the reaction, causing the reaction mixture to assume a pasty form which is difficult to agitate and stir, and in which the reaction fails to go to completion. With concentrated aqua ammonia, density of 0.90, it is necessary to use from 250% to 300% excess of ammonia.

After the introduction of the alum and ammonium hydroxide, the autoclave should be closed and the mixture kept in agitation by the stirring apparatus B and maintained at a proper reactive temperature which should not be less than 60° C. and which, preferably, should be approximately 110° C. because at this temperature all of the ammonia remaining in solution after the reaction is complete will be practically driven off from the autoclave when the conduit F is opened, as by the valve $f$, to permit the ammonia to pass into the absorption tower G from which, as indicated, the solution of ammonia recovered may be conveniently passed to the reservoir E. After the ammonia has been eliminated from the solution in the autoclave the conduit H is opened as by means of the valve $h$ and the contents of the autoclave passed to the thickener I, from which the greater part of the solution separated from the alumina hydrate passes through the launder I and pipe M to the reservoir N. The thickened mixture of the alumina hydrate and sulphate solution is then passed through conduit K to the filter L, where the remaining sulphate solution is separated from the alumina hydrate and passed, as indicated, to the reservoir N, while the alumina hydrate is drawn from the filter as indicated and is a finished article of manufacture.

Referring now to Figure 2, those portions of the diagrammatically illustrated plant which are identical with those indicated in Fig. 1, are indicated by the same reference letters except that the second autoclave illustrated in Fig. 2, has been designated, for convenience, by the reference character $a$. In this plant the storage tank for ammonium hydroxide, shown at E in Fig. 1, is not present nor is the absorption tower indicated in Fig. 1 at G. The new elements of the plant consist in a storage tank for anhydrous ammonia, indicated at R, and a manifold indicated at P. This manifold is connected with the tank R by a pipe S, provided with a valve s and is connected with the tops of each of the autoclaves by means of pipes F¹, provided with valves indicated at f¹ and the manifold is also connected with the lower portion of each autoclave by pipes indicated at Q, provided with valves q. I have also indicated at T a receptacle for water, communicating conduits T¹ leading to the autoclaves A and a and to any other autoclaves which may be included in the plant.

My preferential method for which the plant indicated in Fig. 2 is especially designed, involves the preliminary charging of the autoclaves with finely divided basic alum and water and the basic alum being held in suspension in the water by agitation, I feed into the lower part of the autoclaves ammonia gas derived primarily from the storage receptacle R and delivered through the pipe S, the manifold P and pipes Q, as, for example, when a plurality of autoclaves are used, the ammonia for the autoclave A is supplied in this way and, when the reaction is complete in the autoclave A, the ammonia driven off from the autoclave is, by opening the valve f¹, delivered through the pipe F to the manifold P and through the manifold P and the pipe Q, the valve q of which is open, delivered into the aqueous suspension content in the autoclave a in which it is, of course, absorbed into the water. When the tank A is exhausted of its ammonia, the valve f¹ is closed and the valve s in pipe S opened so that ammonia is delivered directly from the tank R through the manifold and through the pipe Q into the autoclave a so as to raise the strength of the solution of ammonia to the desired point, after which the valves s and q are closed and the reaction permitted to continue in the autoclave a to completion. While this reaction is going on in autoclave a, autoclave A has been discharged and re-charged with an aqueous suspension of basic alum and, when the reaction is complete in autoclave a, valves are manipulated as described so that the ammonia driven off from the autoclave a is first admitted to the autoclave A and then additional ammonia delivered through the manifold to the autoclave A. In all other respects, the operation of the plant indicated in Figure 2, is the same as that indicated in Figure 1.

It is to be noted that the reaction between the water-insoluble basic alum and the ammonium hydroxide solution is a topochemical reaction, i. e., a reaction occurring between a solid and a reagent in solution. At no stage of the reaction is any alumina dissolved in the reagent solution. The easy filtering quality of the produced alumina hydrate is determined entirely by the crystalline state of the finely divided insoluble basic alum starting material.

The actual reaction is thus readily distinguished from the reaction of ammonia with water soluble amphoteric metal salts where it is necessary to control the excess and concentration of the ammonia and the hydrogen ion concentration of the solution. In this case a gelatinous precipitate is obtained. While this form may be readily filtered and handled on the laboratory scale required in analytical determinations, such a precipitate is handled on a commercial scale only at great cost, far in excess of an allowable figure for the cost of producing alumina hydrate on a commercial scale with a view to the manufacture of a pure ore for electrolytic reduction.

Having now described my invention, what I claim as new and desire to secure by Letters Patent, is:

1. The method of producing alumina hydrate which consists in treating in a closed container a suspension of finely divided basic alum in ammonium hydroxide containing ammonia in excess of the amount equivalent to the sulphur trioxide component combined with alumina in basic alum at temperatures above 60° C. to effect the decomposition of the basic alum with formation of insoluble alumina hydrate and a solution of ammonium sulphate and alkali metal sulphate if alkali metal sulphates exist in the basic alum and of ammonia in solution, then driving off from said solution the uncombined ammonia held in solution therein and recovering said ammonia by condensation and absorption and finally separating the alumina hydrate from the ammonia free sulphate solution.

2. The method of claim 1 in which the reactive ammonium hydroxide solution is formed in the presence of an aqueous suspension of basic alum by introducing ammonia gas to said aqueous suspension.

3. The method of claim 1, in which the uncombined ammonia held in solution after the reaction is completed is recovered by condensation and absorption in a further second body of aqueous suspension of basic alum.

ARTHUR FLEISCHER.